Figure 1:
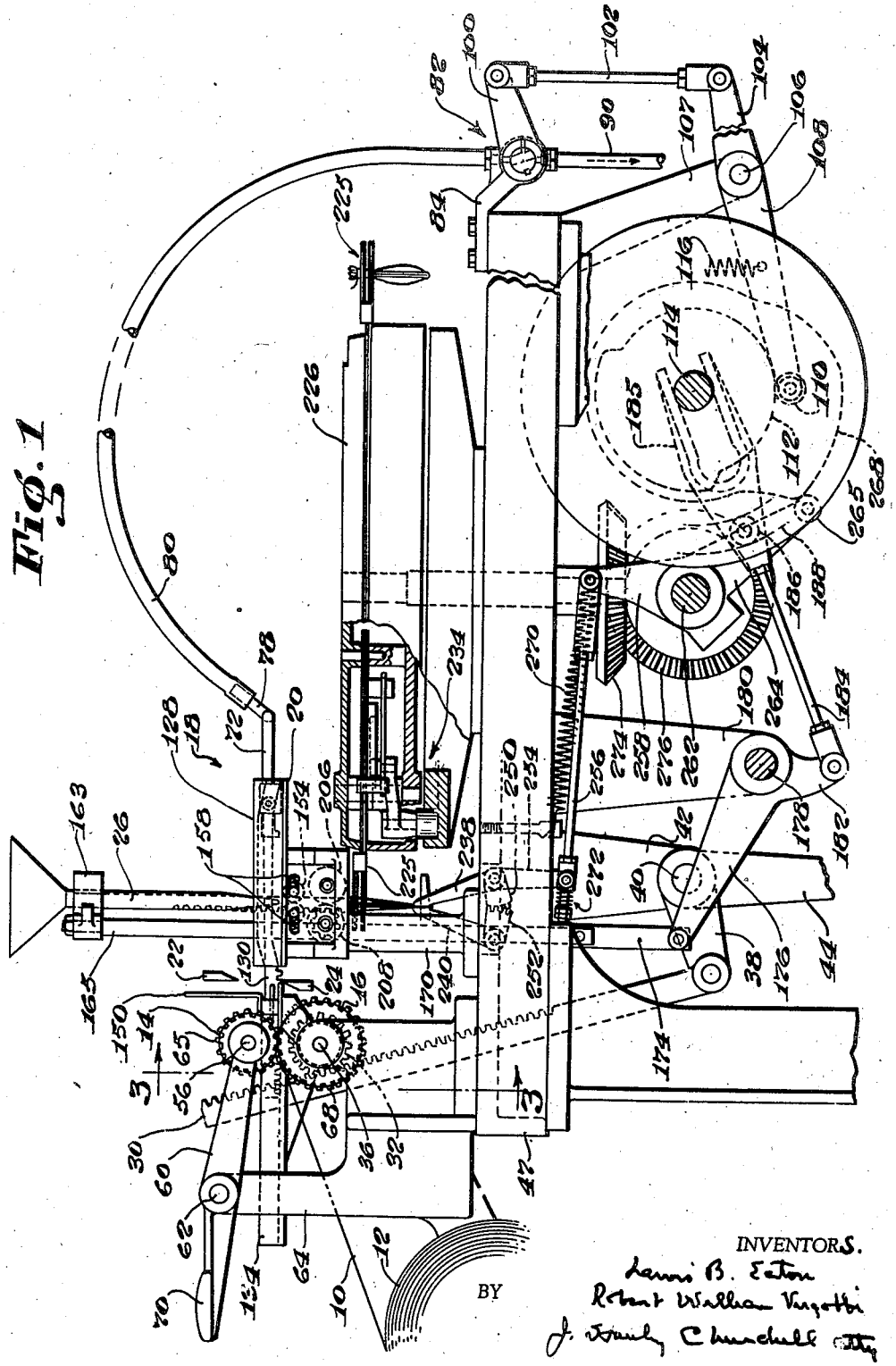

Nov. 4, 1947.　　　L. B. EATON ET AL　　　2,430,280
APPARATUS FOR PRODUCING TEA, COFFEE, OR SIMILAR BAGS
Filed Aug. 12, 1942　　　3 Sheets-Sheet 1

INVENTORS.
Lewis B. Eaton
Robert William Vergobbi
BY J. Frank Churchill Atty

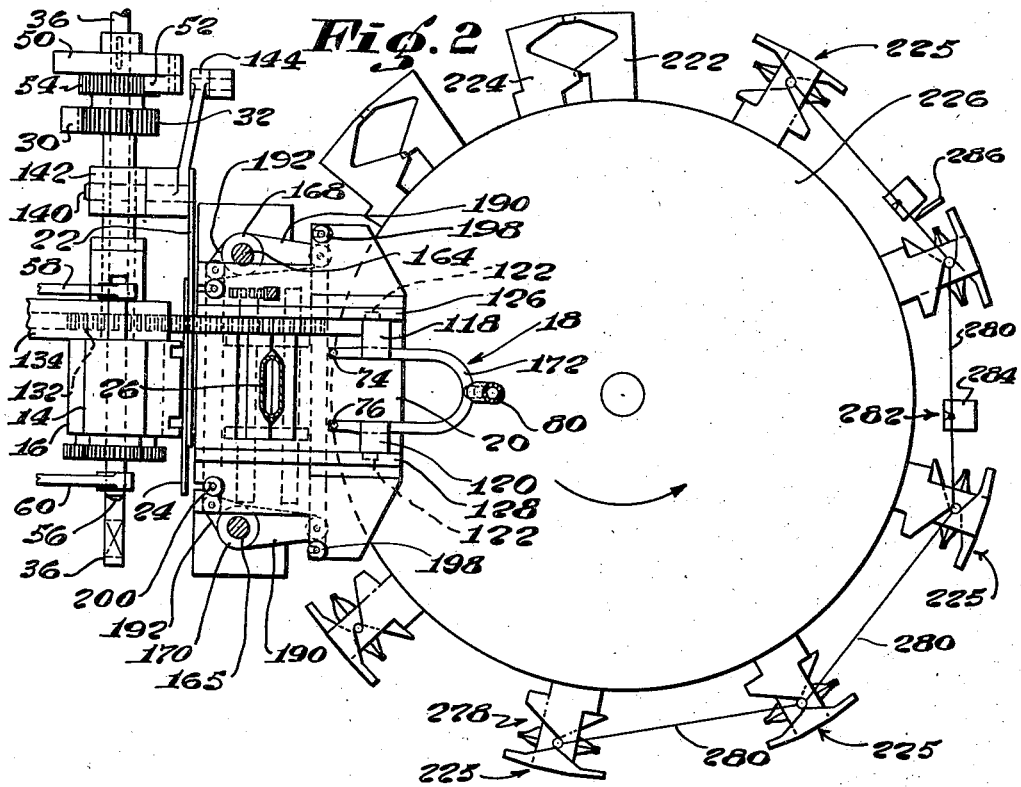
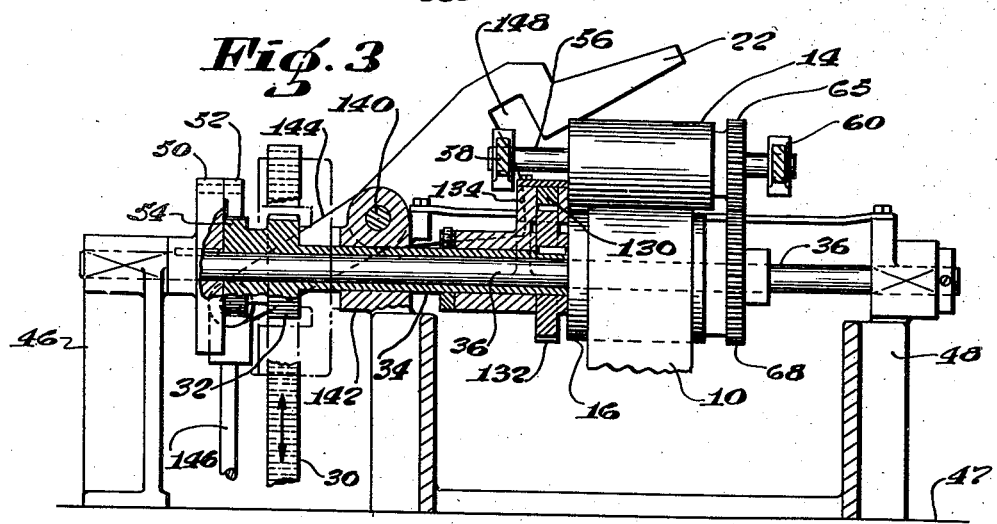
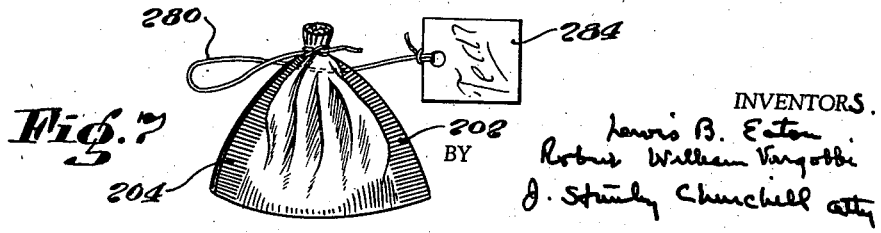

Nov. 4, 1947.                L. B. EATON ET AL                2,430,280
             APPARATUS FOR PRODUCING TEA, COFFEE, OR SIMILAR BAGS
                        Filed Aug. 12, 1942          3 Sheets-Sheet 3
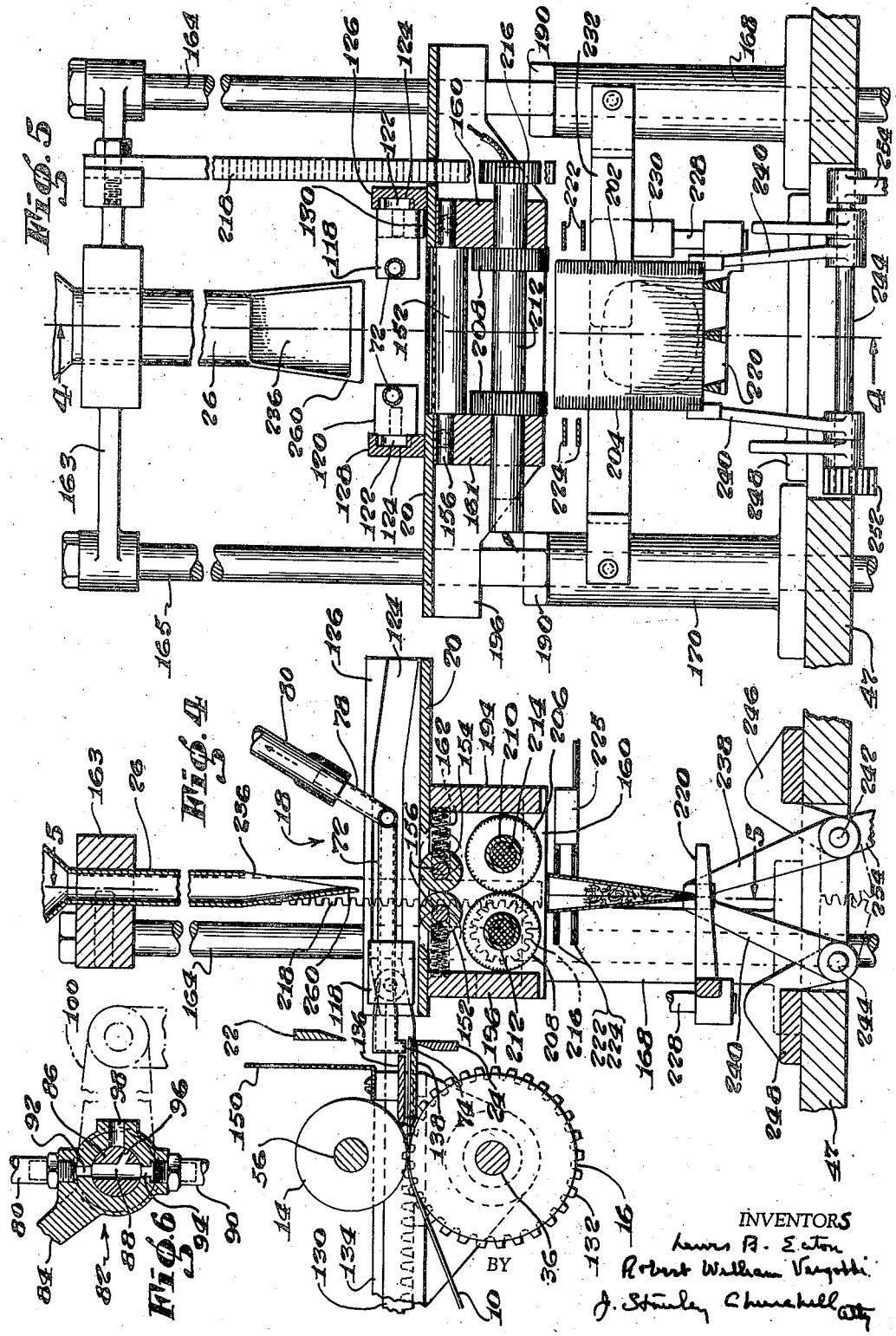
INVENTORS
Lewis B. Eaton
Robert William Vergobbi
BY J. Stanley Churchill  Atty Patented Nov. 4, 1947

2,430,280

UNITED STATES PATENT OFFICE 2,430,280

APPARATUS FOR PRODUCING TEA, COFFEE, OR SIMILAR BAGS

Lewis B. Eaton and Robert William Vergobbi, Quincy, Mass., assignors to Pneumatic Scale Corporation, Limited, Quincy, Mass., a corporation of Massachusetts Application August 12, 1942, Serial No. 454,554

8 Claims. (Cl. 93—3)

This invention relates to apparatus for producing a tea, coffee or similar bag.

In general the object of the invention is to provide a novel and efficient apparatus for use in the production of tea, coffee or similar bags.

A further object of the invention is to provide novel and efficient bag forming apparatus which is particularly adapted for the production of the tea or coffee bag forming the subject matter of our copending application Serial No. 436,084, filed March 25, 1942, in a rapid, economical and practical manner.

With these general objects in view and such others as may hereinafter appear, the invention consists in the apparatus for producing tea, coffee or similar bags and in the various structures, arrangements and combinations of parts hereinafter described and particularly defined in the claims at the end of this specification.

In the drawings illustrating the preferred embodiment of the invention, Fig. 1 is a side elevation of a tea bagging machine embodying the present invention; Fig. 2 is a plan view of the machine shown in Fig. 1; Fig. 3 is a sectional view taken on the line 3—3 of Fig. 1; Figs. 4 and 5 are vertical sectional views, Fig. 4 being a section on the line 4—4 of Fig. 5, and Fig. 5 being a section on the line 5—5 of Fig. 4; Fig. 6 is a cross sectional detail of an air valve to be referred to; and Fig. 7 is a perspective view of the completed bag produced by the present machine.

In general, the present invention contemplates the provision of apparatus for producing a tea, coffee or similar bag, and in its preferred embodiment for providing a tea or coffee bag of the structure forming the subject matter of our copending application Serial No. 436,084, filed March 25, 1942. In general such a bag is preferably formed of soft porous filter paper and preferably impregnated with a thermoplastic impregnant to enable the marginal portions thereof to be sealed together upon the application of heat and pressure thereto. In producing the bag, a rectangular blank of such heat sealable filter paper is folded along a medial line to form two side walls whereupon the sides of the bag are heat sealed face to face along the marginal edges thereof to form a flat bag having rectangular side walls and being open at the top, the folded edge comprising the bottom of the bag. After a charge of the commodity has been deposited into the bag thus formed, the mouth portions of the bag are drawn together to form a contracted neck portion, and a flexible member such as a string or twine is tied around the neck in a manner similar to the procedure now followed in making a pouch type of tea bag. The usual tag may and preferably will be attached to the extended end of the string.

The different features of the present invention are herein illustrated as embodied in an automatic tea bagging machine for producing tea bags of the pouch type and which machine may and preferably will, except as to details to be hereinafter pointed out, be constructed and have the mode of operation of the automatic tea bagging machines forming the subject matter of the United States Patents to Ralph N. Doble, No. 1,726,060, granted August 27, 1929, and to W. S. Cleaves, No. 1,911,805, granted May 30, 1933, to which reference is made, and only sufficient portions thereof have been herein illustrated and described as will enable the features of the present invention to be understood. The tea bagging machines illustrated and described in the above patents to Doble and Cleaves are provided with mechanism particularly adapted for producing tea bags of the pouch type from a rectangular blank of gauze, and, the present invention seeks to utilize the main structure of such machines and to provide mechanism particularly adapted for making filter paper bags of the type shown in our copending application above referred to.

Referring now to the drawings, the improved tea bagging machine illustrated therein is designed to withdraw a web 10 of heat sealable filter paper from which the present bag is to be formed, from a supply roll 12 by a pair of intermittently driven feed rollers 14, 16. During each cycle of operation of the machine, the feed rollers 14, 16, in cooperation with a suction operated device indicated generally at 18, are arranged to advance a predetermined length of the web onto a supporting plate 20 and the length thus advanced is severed from the web by shear members 22, 24, as shown. The blank thus formed is disposed over an opening in the supporting plate 20 and in operative position to be engaged by a vertically reciprocating forming and filling tube 26.

As best shown in Figs. 1 and 3, the rollers 14, 16 are intermittently rotated through connections from the main machine including a vertically reciprocal rack gear 30 arranged to mesh with a gear 32 formed integrally with a hollow elongated shaft 34 rotatably mounted on a shaft 36 upon which the lower withdrawing roll 16 is secured. The reciprocal rack 30 is pivotally connected at its lower end to an arm 38 fast on a rocker shaft 40 journaled in a bracket 42 depending from the machine frame, and, the shaft 40 is rocked by a second arm 44 secured thereto and connected to a cam, not shown, arranged to effect reciprocation of the rack 30 during each cycle of operation of the machine.

The lower roller shaft 36 is rotatably mounted in bearings formed in brackets 46, 48 attached to the platen 47 and in order to effect rotation of the shaft in one direction only, the latter is provided with a pawl carrier 50 fast thereon having a pawl 52 arranged to engage a ratchet 54 formed integrally with the hollow shaft 34. Thus, in operation, the shaft 36 is rotated clockwise viewing Fig. 1 during the upward stroke of the rack and remains idle during descending stroke of the rack. The rack 30 may and preferably will be provided with suitable guides or slide bearings, not shown, arranged to maintain the rack 30 in mesh with its gear 32.

The upper withdrawing roller 14 is mounted on a shaft 56 extending between arms 58, 60 which are secured to a shaft 62 pivotally mounted in a bracket 64. The rollers 14, 16 are geared together by gears 66, 68 formed integrally with their respective rollers, as shown. A handle 70 fast on the pivotal shaft 62 is provided to facilitate manual raising of the upper roll 14 in order to enable the end of the web to be inserted between the cooperating rollers when starting a new supply roll of the filter paper.

In order to support the leading edge of the relatively light weight web as it is being advanced by the rollers 14, 16 onto the supporting plate 20, the suction operated device 18 above referred to is arranged to pick up the leading edge of the web and carry it along simultaneously with and at the same rate as the advancement of the web by the rollers 14, 16. As herein shown, the suction operated device includes a U-shaped suction head or pipe 72 having suction openings 74, 76, one in the end of each leg of the U-shaped member, the ends being turned downwardly at right angles to the legs, as best shown in Fig. 4. The U-shaped member is connected at its base to a pipe 78 provided with a flexible connection 80 leading to an air valve 82. The air valve 82 is mounted in a bracket 84 attached to the machine frame, and, as illustrated in cross-section in Fig. 6, the air valve includes a rotary member 86 having an aperture 88 arranged to connect the suction head with a pipe 90 leading to the source of suction when the member 86 is rocked to present the aperture 88 into alignment with passageways 92, 94, and to discontinue such connection when the member 86 is rocked to move the aperture 88 out of alignment with passageways 92, 94 and into a position in which a second aperture 96 is moved into alignment with a vent 98, as clearly shown in Fig. 6.

Provision is made for rocking the valve member 86 in timed relation to the movement of the suction head, and, as herein shown, see Fig. 1, the valve member 86 is provided with an arm 100 connected by a link 102 to one arm 104 of a two-armed lever pivotally mounted at 106 in a bracket 107. The second arm 108 of the two-armed lever is provided with a cam roll 110 which cooperates with a cam 112 mounted on a cam shaft 114 forming a part of the operative mechanism of the main machine. A spring 116 operates to hold the roller 110 against its cam 112.

Referring now to Figs. 1 and 4, provision is made for supporting and reciprocating the suction head 18 from the position shown in Fig. 4 wherein the extended end of the web is engaged by the suction openings 74, 76, to the position shown in Fig. 1 where the suction is released.

Each leg of the U-shaped member 72 is provided with a supporting block 118, 120, each having a roller 122 arranged to run in a path 124 formed in guide members 126, 128, as best shown in Fig. 5. The path 124 is designed to raise the suction head as it passes over the opening in the plate 20 and to lower it at either end of its stroke. In order to reciprocate the suction head, one of the supporting blocks 118, is connected to a horizontally reciprocal rack gear 130 arranged to mesh with a pinion 132 keyed to the hollow shaft 34, see Fig. 3. The rack 130 is slidingly supported in an elongated guide member 134 mounted to rock on the hollow shaft 34. From the description thus far, it will be observed that the suction unit 18 is advanced simultaneously with the feed of the web between the feed rollers 14, 16 and that the suction unit will be retracted upon the return or descending stroke of the vertically reciprocating rack 30 while the feed rollers 14, 16 remain idle through the connections described.

Upon advancement of a predetermined length of the web onto the plate 20 as above described, provision is made for cutting the web to provide a rectangular blank from which the flat bag is formed. As shown in Figs. 1 and 4, immediately beyond the feed rolls 14, 16, the web is arranged to extend between upper and lower guide plates 136, 138 and over the lower shear member 24 which may be stationarily supported from the machine frame. The movable shear member 22 is pivotally mounted on a stud 140 supported in the bracket 142 and is provided with an arm 144 connected by a link 146 to a cam, not shown, arranged to actuate the movable shear 22 in timed relation to the operation of the web feeding mechanism. As illustrated in Fig. 3, the movable shear member 22 is provided with a cut out portion 148 to avoid the rack 130 during the cutting operation. A guard member 150 may and preferably will be supported adjacent the movable shear, as shown.

From the description thus far it will be observed that the rectangular blank thus formed is disposed over the opening in the plate 20 and in operative position to be engaged by the vertically reciprocating forming and filling tube 26. As herein shown, the tube 26 is wedge shaped at its lower end and is arranged to descend into engagement with the blank and to carry the latter down through the opening in the supporting plate 20 and into the bight of a pair of yieldingly mounted rollers 152, 154 which, in cooperation with the wedge shaped end of the tube 26 operates to fold the blank along a medial line to form the two side walls of a flat bag. The cooperating forming rollers 152, 154 are mounted upon similar shafts 156 which are rotatably received in horizontally disposed slots 158 formed in bearing members 160, 161 secured to the underside of the plate 20. The roller shafts 156 are movable laterally in the slots 158 and the rollers 152, 154 are urged into cooperating relationship by springs 162 as shown.

The forming and filling tube 26 is mounted in a tie piece 163 secured upon the ends of vertical rods 164, 165 which are arranged to be vertically reciprocated in standards 168, 170 attached to the machine frame. The vertical rods 164, 165 extend through the platen 47 and, each rod, is connected by similar links 174 to similar arms 176 fast on a rocker shaft 178 pivotally carried in a bracket 180 depending from the platen. One of the arms 176 is provided with a second arm 182 which is connected by a link 184 to a yoke 185 embracing the cam shaft 114 and is provided with a cam roll 186 cooperating with a closed cam 188 fast on the cam shaft.

It will be observed, as shown in Figs. 1 and 2, that the plate 20 is supported from the standards 168, 170 by arms 190, 192 extending therefrom. The arms 190, 192 support tie pieces 194, 196 upon which the plate 20 is adjustably secured as indicated at 198, 200 in Fig. 2 in order to enable the plate together with the forming rollers to be moved slightly into accurate alignment with the forming tube 26.

With this construction, it will be seen that when the wedge shaped end 260 of the tube 26 is caused to descend, the rollers 152, 154 will spread apart to permit the tube with its folded blank to continue its downward movement. As best shown in Figs. 4 and 5, during such continued movement, the marginal edges 202, 204 of the side walls are engaged by two pairs of heated rollers 206, 208 which operate to seal the side edges of the folded thermoplastically impregnated blank face to face to form a flat bag. The rollers 206, 208, are preferably serrated to form a crimped heat sealed edge upon each side of the bag. The heat sealing rollers are preferably mounted upon hollow shafts 210, 212 journaled in the bearing members 160, 161 and are provided with heating elements 214 as indicated in Fig. 4. It will be observed that the two pairs of rollers 206, 208 are spaced to straddle the descending tube and to engage only the marginal edge of the bag. The heated crimping rollers 206, 208 may and preferably will be driven in timed relation to the descending movement of the tube 26 and, as herein shown, one of the hollow shafts, 212, is provided with a pinion 216 arranged to be engaged by a vertical rack 218 which is secured to and arranged to reciprocate with the tie piece 163 upon which the tube 26 is mounted. Thus, in operation, when the tube 26 is caused to descend, the rollers 208 will be rotated in a direction and at a rate such that the peripheral surface will move along with the descending tube and bag, the second set of rolls 206 being rotated by the frictional engagement with the edges of the bag.

After passing through the heat sealing rollers 206, 208, as above described, during the downward movement of the forming and filling tube 26, continued movement of the latter is arranged to present the bottom or folded edge of the bag against a bottom support 220, in which position the upper or mouth portion of the bag is presented between the open jaws 222, 224 of a gripping unit 225, a plurality of which are carried by a rotatably mounted disc 226 arranged to be intermittently moved to present successive grippers in their opened condition beneath the forming station. As herein shown, the bottom support 220 is adjustably secured to a vertical stud 228 depending from a bracket 230 attached to a cross bar 232 extending between the standards 168, 170.

The gripping jaws 222, 224 may be operated by the mechanism indicated generally at 234 which may comprise the gripping mechanism illustrated and described in the patent to Cleaves above referred to. Prior to releasing the gripping jaws to permit them to be closed upon the bag thus formed, a charge of the commodity, such as tea, is introduced into the top of the tube 26 which, as illustrated, is provided with a funnel shaped upper end. The commodity is permitted to fall by gravity through the tube and out through an opening 236, formed in one side of the wedge shaped end of the tube, see Fig. 4, and into the bag and thereafter the tube may be withdrawn, or, the commodity may be arranged to flow out of the opening 236 during the withdrawal of the tube. Upon withdrawal of the tube, the jaws 222, 224 are released, as above described, contracting the mouth and neck portions of the bag together in bunched relation, as shown in Fig. 7.

In order to prevent the filled bag thus formed from being drawn upwardly when the tube is withdrawn and also to retain the folded or bottom edge of the bag in its extended or spread out condition when the grippers are released to contact the neck or mouth of the bag, provision is made for grasping the bag at the lower corners thereof when it arrives in its lowermost position, as shown in Fig. 5. As herein shown, the retaining mechanism comprises two pairs of clamping arms 238, 240 secured upon shafts 242, 244 which are supported in brackets 246, 248 attached to the machine frame. The arms 238, 240 are arranged to be rocked into and out of clamping arrangement with the bag through connections including a pair of segmental gears 250, 252 secured to and connecting the shafts 242, 244. A lever 254 fast on the shaft 244 is connected by a link 256 to one arm 258 of a cam lever pivotally mounted on a shaft 262. The second arm 264 of the cam lever is provided with a roller 265 cooperating with a cam 268 fast on the cam shaft 114. A spring 270 is provided to hold the roller 265 against its cam. A yieldable connection 272 on the link 256 permits the latter to continue its stroke to increase the clamping pressure when the arms 238, 240 engage the bag, as shown in Fig. 1.

In the operation of the machine, the bag is supported and carried by its gripping unit 225 to successive stations of the tea bagging machine for completing the bag. The mechanisms for completing the production of the bags may and preferably will comprise those illustrated and described in the Cleaves patent, No. 1,911,805 above referred to, only sufficient portions being herein shown to enable the present invention to be understood. The rotary disc 226 is arranged to be intermittently moved to present the bag to the various stations through connections including the bevel gears 274, 276. In general, the mechanisms to which the bag is moved include a string applying mechanism, not shown, disposed at station 278 and arranged to apply a string closure to the neck portion of each of successive bags to close the same. As herein shown, successive bags held by the gripping units 225 are connected by strands 280 of a continuous length of string extending therebetween and the bags thus joined are advanced to the tagging mechanism, disposed at station 282 at which station a tag 284 is attached to each successive strand of string. The strand is thereafter severed by a knife blade 286 at a point adjacent a tag so that each bag is provided with an individual string and tag. Provision may also be made for trimming off the surplus material extending above the string closure. The jaws 222, 224 are thereafter opened to release the completed bag which may fall upon an outgoing conveyer, not shown, to be delivered from the machine. The jaws then remain in their opened condition until they again arrive at the forming station to be closed upon the mouth portion of a succeeding bag as above described.

From the above description it will be observed that the present construction of bag forming apparatus is such as to enable a filter paper bag of the pouch type to be produced in a rapid, economical and practical manner.

While the preferred embodiment of the invention has been herein illustrated and described, it will be understood that the invention may be embodied in other forms within the scope of the following claims.

Having thus described the invention, what is claimed is:

1. In apparatus of the character described, in combination, bag forming means including a reciprocal forming member, means for folding a blank of heat sealable paper about the forming member to form a flat bag having but two side walls and two pairs of cooperating heat sealing rollers spaced apart and disposed to engage and seal the marginal edges of the side walls of the folded bag face to face as the latter is carried therebetween by the forming member to form a flat bag open at the mouth, said reciprocal forming member operating to maintain the portions of the side walls intermediate said marginal edges separated during the sealing operation.

2. In apparatus of the character described, in combination, bag forming means including a hollow reciprocal forming and filling member, means for folding a blank of heat sealable filter paper about the forming member to form the two side walls of a flat bag, two pairs of cooperating heat sealing rollers spaced apart and disposed to engage and seal the marginal edges of the side walls of the folded bag face to face as the latter is carried therebetween by the forming and filling member to form a flat bag having rectangular side walls and open at the mouth, said forming and filling member having an opening in one side thereof through which a charge of the commodity is introduced into the bag, a pair of grippers arranged to engage the mouth portion of the bag and to contract the same to form a bag of the pouch type upon withdrawal of the forming and filling member, said reciprocal forming member being arranged to present the bag into operative position with relation to said grippers prior to withdrawal thereof, and clamping means for holding the folded bottom of the bag in its extended position during withdrawal of the tube and while the mouth portion of the bag is being contracted.

3. In apparatus of the character described, in combination, bag forming means including a pair of yielding mounted cooperating rollers, a reciprocal forming member mounted to pass between said rollers, means for positioning a blank of bag forming material in operative position to be engaged by said reciprocal forming member and to be carried between said yieldingly mounted rollers to effect folding of the blank about the end of the forming member whereby to provide a partially formed bag having but two side walls, and means for adhesively uniting the side walls face to face along the marginal edges as the bag is carried therepast by said forming member to form a flat bag having rectangular side walls and open at the mouth, said reciprocal forming member operating to maintain the portions intermediate said marginal edges separated during the sealing operation.

4. In apparatus of the character described, in combination, bag forming means including a pair of yielding mounted cooperating rollers, a reciprocal forming member arranged to pass between said rollers, means for positioning a blank of heat sealable bag forming material in operative position to be engaged by said reciprocal forming member and to be carried between said yieldingly mounted rollers to effect folding of the blank about the end of the forming member whereby to provide a partially formed bag having two side walls, and two pairs of cooperating heat sealing rollers spaced apart and disposed to engage the marginal edges of the side walls of the folded bag as the latter is carried therebetween by the forming member to form a bag open at the mouth.

5. In apparatus of the character described, in combination, bag forming means including a pair of yielding mounted cooperating rollers, a reciprocal forming member arranged to pass between said rollers, means for positioning a blank of heat sealable bag forming material in operative position to be engaged by said reciprocal forming member and to be carried between said yieldingly mounted rollers to effect folding of the blank about the end of the forming member whereby to provide a partially formed bag having two side walls, two pairs of cooperating heat sealing rollers spaced apart and disposed to engage and seal the marginal edges of the side walls of the folded bag face to face as the latter is carried therebetween by the forming member to form a flat bag having rectangular side walls and open at the mouth, said forming member being hollow and having an opening therein through which a charge of the commodity may be introduced, means for contracting the mouth portion of the bag to form a pouch type closure upon withdrawal of the reciprocal forming member, said reciprocal forming member being arranged to present the bag into operative position with relation to said mouth contracting means, and clamping means for retaining the bag in operative position to said closing means during withdrawal of the forming member, said clamping means being also operative to maintain the folded bottom of the bag in its extended position while the mouth portion of the bag is being contracted.

6. In apparatus for producing a tea or similar bag, in combination, means including a reciprocal forming member for folding a blank of heat sealable paper to form two side walls of the bag and a folded bottom, means for heat sealing the side walls face to face along the marginal edges while carried by said forming member to form a substantially flat bag open at the mouth, said forming member being arranged to maintain those portions intermediate the marginal edges separated during the sealing operation, said forming member being hollow and having an opening therein through which a charge of the commodity may be introduced into the bag, and bag closing mechanism for puckering the mouth thereof to form the contracted neck portion of a pouch type bag, said forming member being arranged to dispose the bag in operative position to said bag closing mechanism, and means engageable with the bottom edge of the bag when presented to said closing position by the forming member for maintaining said folded bottom edge in an extended condition during the closing operation.

7. In apparatus of the character described, bag forming means including a reciprocal forming member having a wedge-shaped end, means for folding a blank of heat-sealable paper about the forming member to form the two side walls of a flat wedge-shaped bag, two pairs of cooperating heat-sealing rollers spaced apart and disposed to engage and seal the marginal edges of the side walls of the folded bag face to face as the bag is carried therebetween by the forming member, to thereby form a flat wedge-shaped bag open at the mouth, said forming member being hollow and having an opening through which a charge of a commodity may be inserted into the bag.

8. In apparatus of the character described, bag forming means including a reciprocal forming member having a wedge-shaped end, means for folding a blank of heat-sealable paper about the forming member to form the two side walls of a flat wedge-shaped bag, two pairs of cooperating heat-sealing rollers spaced apart and disposed to engage and seal the marginal edges of the side walls of the folded bag face to face as the bag is carried therebetween by the forming member to thereby form a flat wedge-shaped bag open at the mouth, said forming member being hollow and having an opening through which a charge of a commodity may be inserted into the bag, said wedge-shaped forming member being operative to maintain the folded bottom of the bag in an extended condition.

LEWIS B. EATON.
ROBERT WILLIAM VERGOBBI.

REFERENCES CITED

The following references are of record in the file of this patent:

UNITED STATES PATENTS

| Number | Name | Date |
|---|---|---|
| 1,295,951 | Armstrong | Mar. 4, 1919 |
| 1,726,060 | Doble | Aug. 27, 1929 |
| 1,911,805 | Cleaves | May 30, 1933 |
| 2,027,434 | Jurgens et al. | Jan. 14, 1936 |
| 2,166,473 | Lum et al. | July 18, 1939 |
| 1,976,211 | Bickford | Oct. 9, 1934 |
| 2,162,263 | Lindholm et al. | June 13, 1939 |
| 1,044,454 | Harris | Nov. 12, 1912 |
| 1,452,308 | Miller | Apr. 17, 1923 |
| 1,810,471 | English | June 16, 1931 |
| 2,177,787 | Root | Oct. 31, 1939 |